United States Patent
Lutz

(10) Patent No.: US 7,407,056 B2
(45) Date of Patent: Aug. 5, 2008

(54) AUTOMATIC CONTAINER RECYCLING APPARATUS

(75) Inventor: Bernhard Lutz, Delbrück (DE)

(73) Assignee: Wincor Nixdorf International GmbH (DE)

( * ) Notice: Subject to any disclaimer, the term of this patent is extended or adjusted under 35 U.S.C. 154(b) by 177 days.

(21) Appl. No.: 10/579,116

(22) PCT Filed: Sep. 20, 2004

(86) PCT No.: PCT/EP2004/010541

§ 371 (c)(1),
(2), (4) Date: May 11, 2006

(87) PCT Pub. No.: WO2005/052870

PCT Pub. Date: Jun. 9, 2005

(65) Prior Publication Data

US 2007/0080045 A1    Apr. 12, 2007

(30) Foreign Application Priority Data

Nov. 14, 2003 (DE) ................................ 103 53 537
Jul. 2, 2004 (DE) ......................... 10 2004 032 330

(51) Int. Cl.
*B07C 5/00* (2006.01)
*B65G 15/00* (2006.01)

(52) U.S. Cl. .................. 209/617; 209/522; 209/618; 209/689; 198/626.1; 198/626.2

(58) Field of Classification Search ......... 209/521–524, 209/529, 617, 618, 620, 689, 930; 198/626.1, 198/626.2, 626.3, 626.5, 369.3, 373, 411, 198/620
See application file for complete search history.

(56) References Cited

U.S. PATENT DOCUMENTS 4,151,908 A    5/1979    Brusa (Continued)

FOREIGN PATENT DOCUMENTS

DE    2012651 U1    2/2002

(Continued)

OTHER PUBLICATIONS

International Search Report—PCT/EP2004/010541, ISA/EPO, Nov. 3, 2005, Rijswijk, NL.

(Continued)

*Primary Examiner*—Joseph C Rodriguez
(74) *Attorney, Agent, or Firm*—Harness, Dickey & Pierce, P.L.C.

(57) ABSTRACT

The invention relates to a unit for automatic recycling apparatuses for containers, e.g. cans and bottles made of glass, plastic, or metal. Said unit comprises a conveying device with a conveyor belt for advancing the containers in the direction of the longitudinal axis thereof, and rotating rollers that are provided with a surface area and can be moved from a neutral position into an identifying position in which said rotating rollers disengage the container from the conveying device and make the container rotate. According to the invention, the rollers are embodied as hollow elements and are provided with a breakthrough in the longitudinal direction. At least one conveying device is disposed in the rollers, respectively, while the conveyor belt is arranged in the area of the breakthrough. The rotating rollers and the conveying device are mounted separately, the surface area of the rollers overlapping the conveyor belt of the conveying device when the rotating rollers are rotated.

18 Claims, 6 Drawing Sheets

U.S. PATENT DOCUMENTS

| | | | |
|---|---|---|---|
| 5,934,440 A | 8/1999 | Kroghrud et al. | |
| 6,554,122 B2 * | 4/2003 | Auno et al. | 198/369.3 |
| 6,776,279 B2 * | 8/2004 | Krull et al. | 198/626.5 |
| 2003/0187546 A1 | 10/2003 | Holmen et al. | |

FOREIGN PATENT DOCUMENTS

| | | |
|---|---|---|
| DE | 10055208 A1 | 5/2002 |
| DE | 69715876 T2 | 4/2003 |
| EP | 1167247 A | 1/2002 |
| EP | 1167247 B1 | 7/2003 |
| WO | WO-98/02853 A1 | 1/1998 |
| WO | WO-02/12095 A1 | 2/2002 |

OTHER PUBLICATIONS

English translation of the International Preliminary Report for PCT/EP2004/016541.

* cited by examiner

AUTOMATIC CONTAINER RECYCLING APPARATUS

CROSS REFERENCE TO RELATED APPLICATIONS

This application is a 371 National Stage Application of International Application No. PCT/EP2004/010541, filed Sep. 20, 2004. This application claims the benefit of German Application No. 10 2004 032 330.5, filed Jul. 2, 2004 and German Application No. 103 53 5372.3, filed Nov. 14, 2003. The disclosure(s) of the above applications are incorporated herein by reference.

The invention relates to a device for recycling containers, e.g. cans and bottles made of glass, plastic or metal, and to a unit for automatic recycling apparatuses for containers, wherein the containers are advanced to an identifying device in a lying position by means of a conveying device, in which identifying device characteristic data of the containers are detected. In particular, it is to be determined whether the container is a one-way container or a multiple-way container (recyclable) because these two types of containers are moved to different devices for further treatment.

A unit for automatic container recycling apparatuses is known from DE 201 12 651 U1 which is composed of two endless conveyor belts arranged in v-shape such that for example a bottle or a can may be advanced on these conveyor belts in the direction of the longitudinal axis thereof. Two rollers to be driven by a rotary actuator are located below the conveyor belts. The conveyor belts can be traversed resulting in the container falling on the rollers and being rotated by them. In this process, a detector mounted above the conveying device detects an identification code, such as a bar code, on the container. After detection of the bar code, the conveyor belts are traversed again resulting in the container, which is supported by the rollers, being lifted again and fed forward by the conveyor belts.

A device is known from EP 1 167 247 B1 which has the conveyor belts for a translational movement integrated into the rollers for a rotational movement of the container such that the conveyor belts are also moved during the rotational movement of the rollers.

However, the known conveying and rotation units for containers such as bottles or cans are generally arranged in an expensive and complicated way. Particularly the dumping mechanism of the conveyors has a mechanically expensive design and is very susceptible to faults due to wear in case of continuous operation. The other solution is also expensive as these conveyor belts corotate with the revolving turn around rollers during rotational movement of the rollers and are therefore driven in a complicated way.

Therefore, it is the object of the present invention to provide a unit for automatic container recycling apparatuses which is defined by a more simple and stable mechanical structure and which can be manufactured in an overall more cost-effective way.

According to the invention, this object is achieved with the unit for automatic container recycling apparatuses in that the rollers are embodied as hollow elements and have at least one breakthrough in the longitudinal direction. At least one conveying device is disposed in the rollers, respectively, while the conveyor belt is arranged in the area of the breakthrough. The rotating rollers and the conveying device are mounted separately, the surface area of the rollers overlapping the conveyor belt of the conveying device when the rotating rollers are rotated.

The solution according to the present invention is advantageous in that a compact and structurally simple unit has been created by embodying the rollers as hollow elements and by integrating a conveying device into the cavity of the rotating rollers. The rollers for rotating the container and the conveying device for transversal transport of the container can be controlled independently of each other such that the conveying device is not moved when the rollers are rotated. As distinct from a complete integration of the conveyor belt into a rotating roller, the drive motor can easily be located outside of the rotating rollers according to the solution of this invention. The arrangement is advantageous in that the position of the conveyor belt is fixed and does not change during the rotational movement of the rollers. Apart from the drive motors for the rollers and for the conveyor belts, no additional motors are required for the tilting or yaw movements. Since only one motor is required for moving the conveyor belts, a synchronized movement of both conveyor belts can be ensured. The container is advanced in transport position by the conveyor belts. When the rollers are rotated, the bottle is lifted slightly by the surface areas of the rollers and is rotated by the rollers such that a detector positioned above the rollers is able to detect an identification feature on the container. Altogether, the unit is very easy to service and to maintain because the single components are easily accessible.

According to another aspect of the invention, a method for handling containers in a lying position according to claim 13 is provided, as well as apparatuses for handling containers in a lying position according to claims 15 and 17.

A device is known from WO 98/02853 wherein a v-shaped conveyor advances liquid containers in a lying position. Characteristic features of the container, such as the contour or an identification code, are detected by means of a detection unit. Inserted containers can be returned to their previous position or feeding position by means of the v-shaped conveyor. Rotating rollers having movable bearings are positioned above the conveyor and can be moved laterally towards each other and away from each other by changing the spacing. In the case of this space changing movement, a container is lifted and rotated by the conveyor such that an identification code may be read by the detection unit. When the rotating rollers are moved away from each other, the container will fall on the v-shaped conveyor and can be advanced from that point in the direction of the longitudinal axis thereof. This device requires an expensive movement mechanism for laterally moving the rotating rollers, and it requires space for construction and movement which has a negative effect on the size of the entire device as well as its stability.

Document WO 02/12095 A1 defines the generic term for method claim 13. In the method according to that document, two conveyors with their corresponding conveyor belts may adopt two positions. In a first position with the conveyor belts forming a v-shape, the container is lying on the conveyor belts. Starting from this position, the conveyors and the corresponding conveyor belts are then moved away from each other to a adopt a second position in which space is opened for rotating rollers having stationary bearings located below the conveyor belts. Due to its weight, the container falls down on these rotating rollers and is rotated by them to allow the code reader to read the identification code located on the container. The conveyors including the conveyor belts are then traversed into the first position whereby the container is lifted by the rotating rollers. The container may then be advanced in the direction of its longitudinal axis. The lateral movement of the conveyor belts requires an expensive movement mechanism and a large corresponding structure space.

WO 02/12095 A1 and DE-A-201 12 651 further describe an apparatus for handling liquid containers according to the generic terms of claims 15 and 17, respectively. This apparatus is intended to have a mechanically simple structure enabling detection of cans or bottles having any type of cross section or substantially different cross sections. Such container forms may have characteristic features and contours, which are detectable from a certain detection angle of a detection unit only when the container is rotated. For this reason, the detection unit detects characteristic features of the container, e.g. the contour, the identification code or the like, during rotation of the container. This apparatus also provides means to laterally move the two conveyor belts away from each other, from a first position in which they are supporting the container to a second position in which a pair of rotating rollers having stationary bearings appear in the space between the conveyor belts. The container falls down on these rotating rollers and its characteristic features are then detected by means of the detection unit during rotation of the container. This apparatus also requires an expensive movement mechanism for lateral movement of the conveyor belts and the corresponding structure space.

An object of the invention is to provide a method and apparatuses providing high reliability when in operation, allowing a compact constructional design and altogether being easier to service and to maintain.

A new approach contrasting with prior art is taken for the solutions according to method claim 13 and apparatus claims 15 and 17. The rotating rollers are embodied as hollow elements and have bearings arranged stationarily. The rotating rollers may, for example, be mounted in bearings which are rigidly connected to the housing of an automatic recycling apparatus. The relative position of the rotational axes of the rotating rollers to one another does not change during operation. Furthermore, the conveyor is arranged stationarily within each rotating roller. The corresponding conveyor framework supporting the conveyor belt may, for example, be rigidly connected to the housing of the automatic recycling apparatus. The conveyor belts of the two conveyors together form a v-shape. During operation, the relative position of the conveyors to one another does not change in contrast to the subject matter according to WO 02/12095 A1, i.e. the v-shape is maintained during the entire operation. Accordingly, no additional movement mechanism for traversing the conveyor belts is required (as in WO 02/12095 A1), or no additional movement mechanism for traversing the rotating rollers is required (as in WO 98/02853 A1). Therefore, the drive motor can easily be located outside of the rotating rollers according to the solution of this invention. The arrangement is advantageous in that the position of the conveyor belt is fixed and does not change during the rotational movement of the rollers. Apart from the drive motors for rollers and conveyor belts, no additional motors are required for the tilting or yaw movements. Since only one motor is required for moving the conveyor belts, a synchronized movement of both conveyor belts can be ensured. Accordingly, the technical effort is reduced in the solution of this invention and the mechanical stability as well as the operational reliability are enhanced. Each rotating roller has a breakthrough in the longitudinal direction on its surface area. In the first position with the container lying on the conveyor belts, the circumferential surface of the container extends into the inner space of the rotating roller. When the rotating roller is rotated, the surface area overlaps the conveyor belt covering it for protection. By including the conveyor belts into the rotating rollers and by disposing stationary conveyors and stationary bearings for the rotating rollers, a small and compact constructional design is obtained. Overall, the unit is very easy to service and to maintain as the single components are easily accessible.

The measures described in claim 14 allow an accelerated identification process. Rotating the container may be cancelled when the identification code is already detectable in the first position.

The measures according to claim 16 ensure that the detection unit is able to accurately detect the contour of the container. In this embodiment, no high requirements are made on the detection unit, e.g. a camera, with respect to processing speed.

Further details of the invention will become readily apparent from the below description and drawing.

IN THE DRAWING

FIG. 1 schematically shows a front view of a first embodiment of the unit according to the present invention for an automatic recycling-apparatus for containers in the neutral position for transport of the container;

Figure 1:
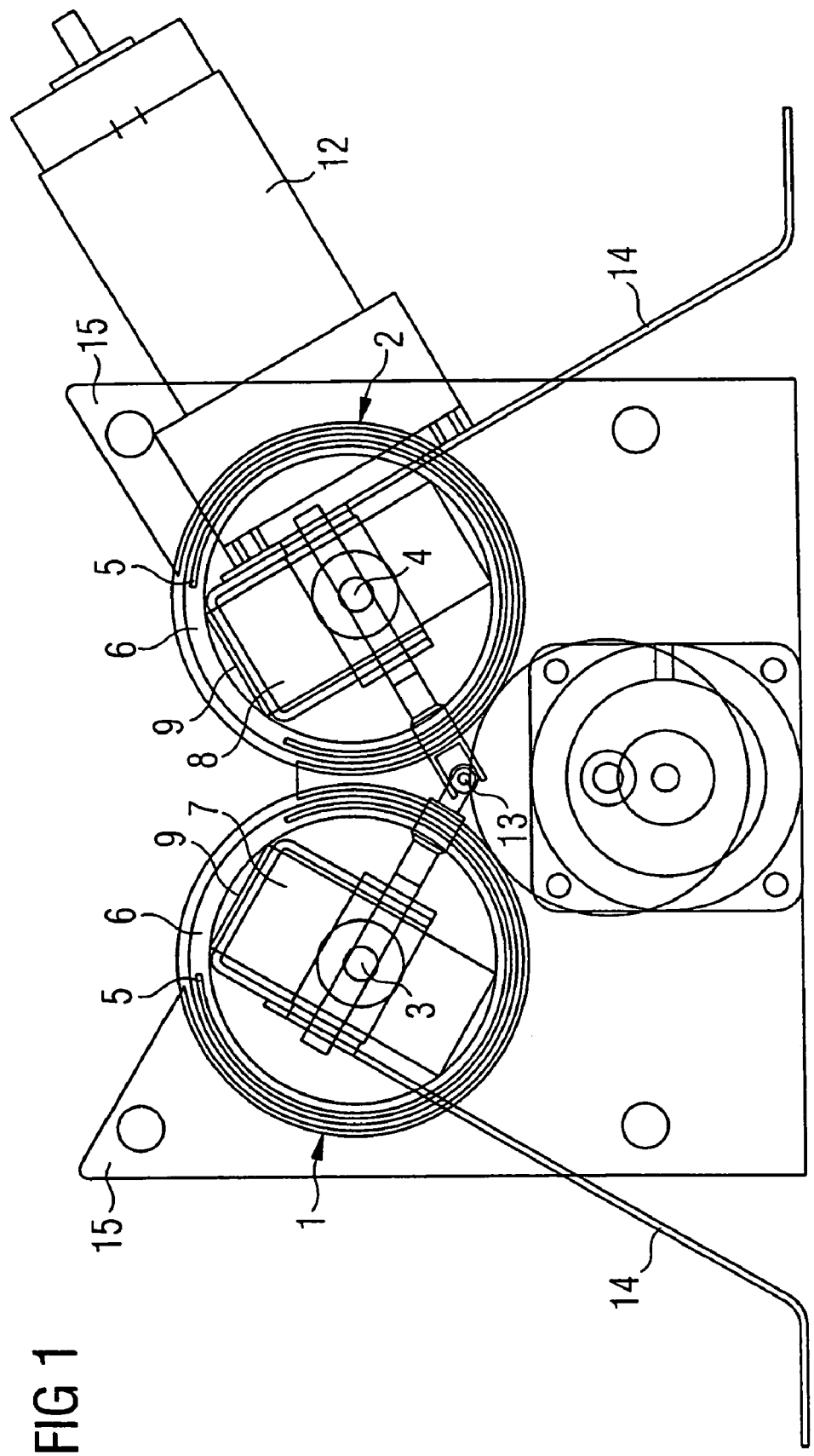
Figure 2:
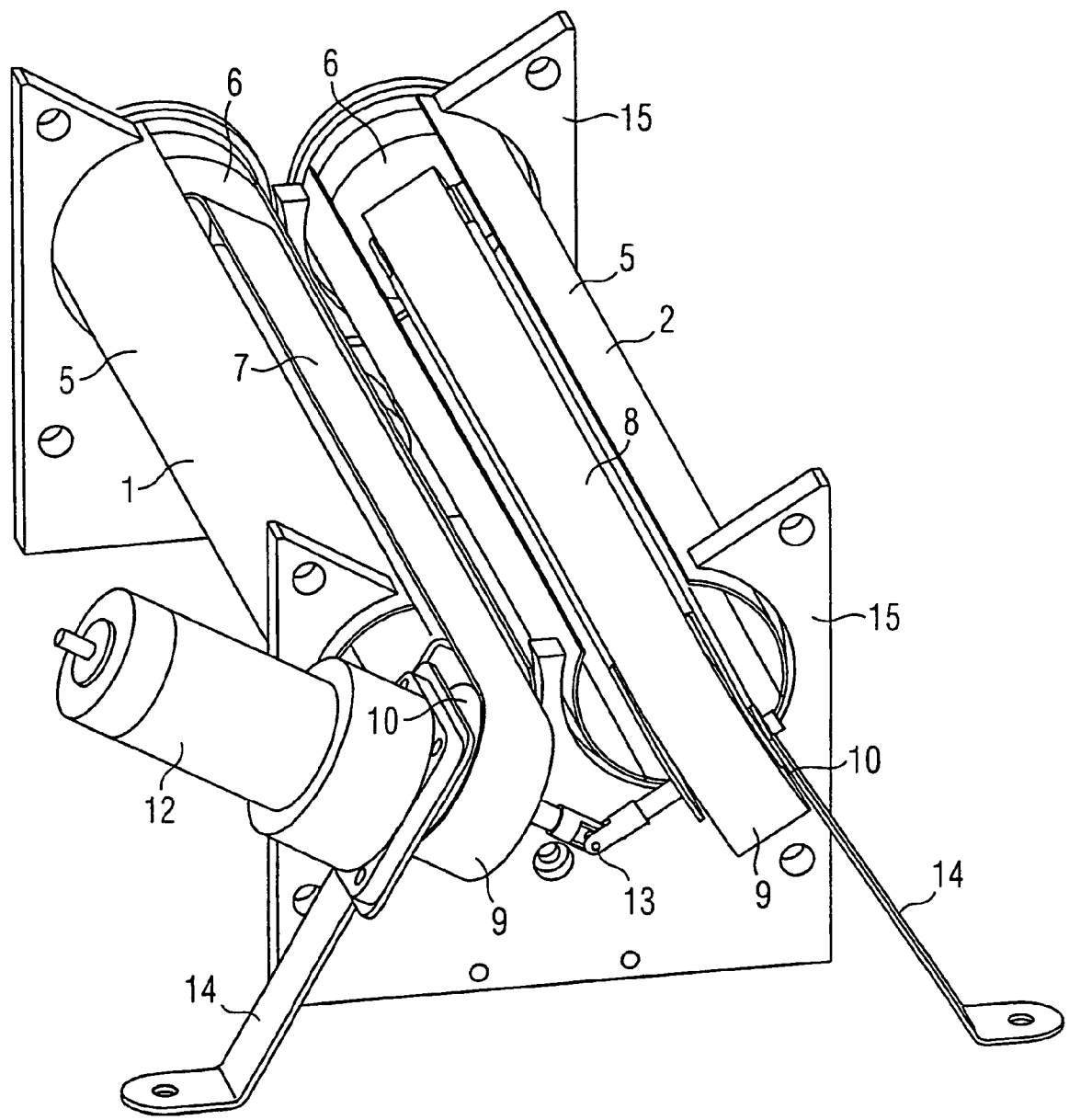
FIG. 2 shows an oblique view of the unit of FIG. 1.
Figure 3:
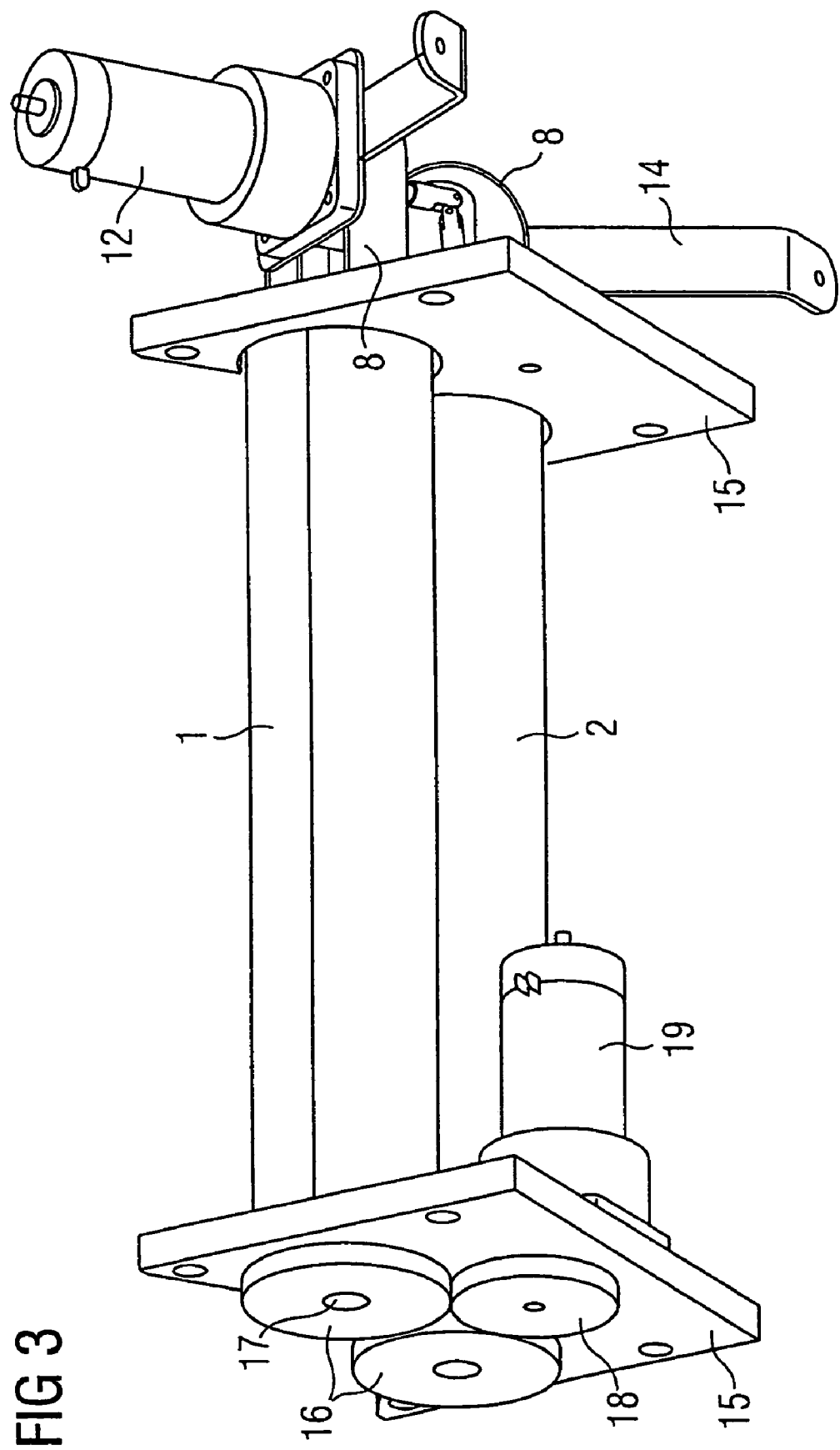
FIG. 3 shows a bottom view of the unit of FIG. 1.
Figure 4:
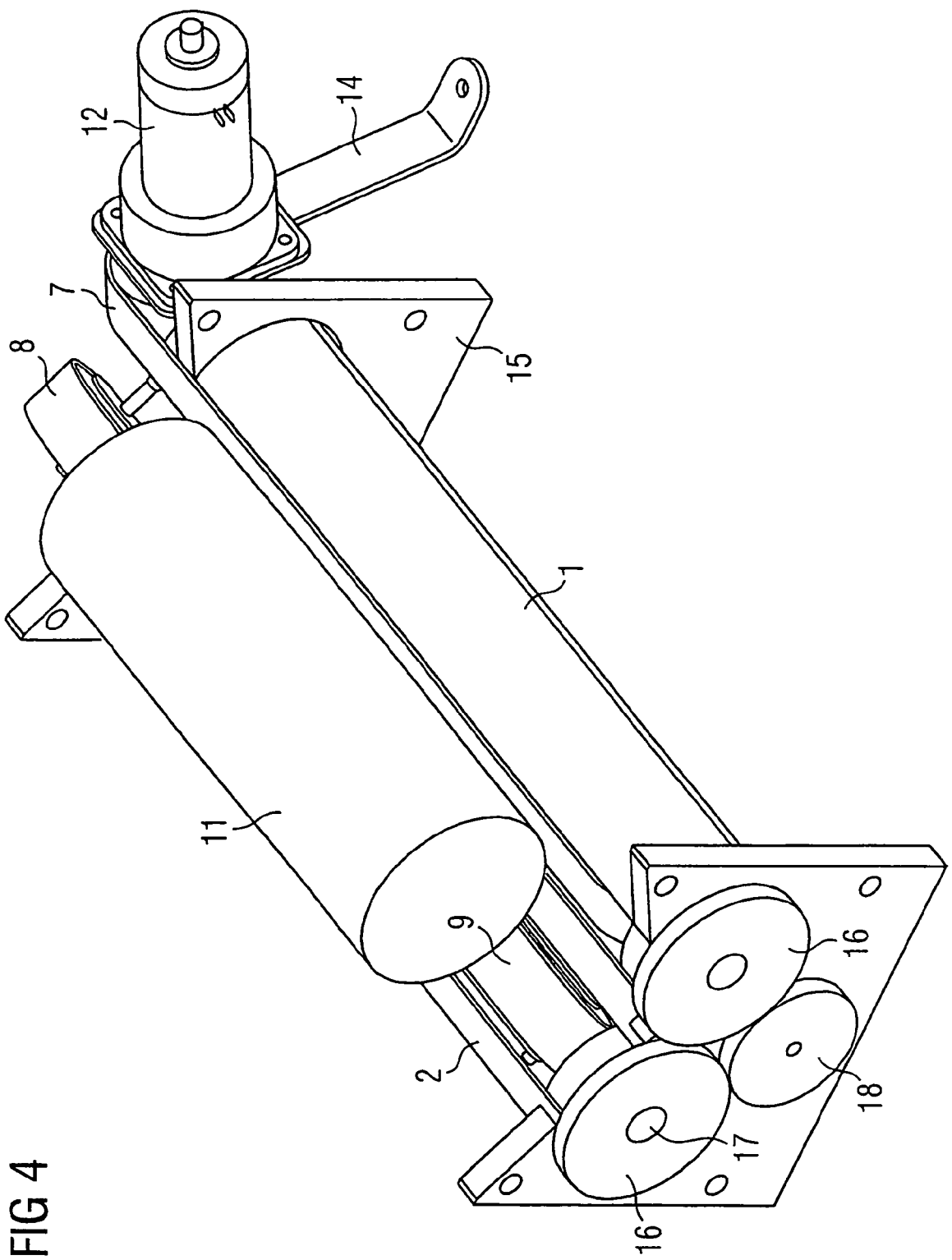
FIG. 4 shows an end view of the unit of FIG. 1 with a liquid container.

A unit for automatic container recycling apparatuses for transport and rotation of containers such as bottles and cans in a lying position according to the present invention is depicted in FIG. 1. Such unit is located in an automatic apparatus for returning containers such as glass bottles, PET bottles and cans. The containers are placed on the transport unit through an inlet port (not shown) in the housing of the automatic apparatus. The unit is made of two rollers 1 and 2 rotatable around axes 3 and 4. Rollers 1, 2 have a hollow form, each showing a breakthrough 6 in the surface area 5 thereof. A conveying device 7, 8 is located in each one of rollers 1, 2. Conveying devices 7, 8 each have a conveyor belt 9, which is guided around turn around rollers 10. Conveying device 7, 8 is arranged within the. rollers 1, 2 such that conveyor belt 9 is located just below the surface area 5 of the rollers 5 in the area of the breakthrough 6. In a transport position, as depicted in FIG. 4, a container 11 is resting on the conveyor belts 9 of the conveying devices 7, 8, which form an angle of approximately 120 degrees with one another and are therefore arranged in v-shape. Advantageously, conveying devices 7, 8 are driven jointly by an electric motor 12 and a coupling 13. A container can be advanced in the longitudinal direction thereof by means of the conveying system 7, 8. Turn around rollers 10 of conveying devices 7, 8 are attached to supports 14, which are firmly connected to a basic frame located in the automatic container recycling apparatus such that the position of conveying devices 7, 8 is fixed.

Rotating rollers 1, 2 are supported free to rotate in a bearing frame 15 acting on the surface area 5. Rotating rollers 1, 2 are preferably supported between two bearing frames 15 in order to obtain enhanced stability for support of rollers 1, 2. Advantageously, rollers 1, 2 are provided with a gear rim 16 on a front side for driving rollers 1, 2. Rollers 1, 2 can be supported on the drive end either by means of the bearing frame 15, too, or on the gear rim axis 17. Rollers 1, 2 can be made to rotate by means of a gear wheel 18 being in engagement with both gear rims 16 of the rollers 1, 2. Gear wheel 18 is driven by a second motor 199. Particularly drive motor 19 for driving rollers 1, 2 can easily be located outside of the roller. When rotating rollers 1, 2 are made to rotate, the surface area 5 of rollers 1, 2 moves over the conveyor belt 9 of the respective conveying device 7, 8. A container 11 advanced on the conveyor belts 9 of the conveying device 7, 8 is lifted slightly by the surface area 5 of the roller 1, 2 and is at that moment supported by the surface areas 5 of both rollers 1, 2. The container 11 is then rotated by the rotational movement of the rollers 1, 2 rotating in the same direction such that a detector such as a scanner positioned above rollers 1, 2 (not shown) is able to detect an identification feature like, for example, a bar code or another optical coding located on the container as soon as the feature enters the detection area of the detector. During rotational movement of the rollers 1, 2, the conveyor belts 9 of the conveying devices 7, 8 advantageously stop moving. However, it is also possible that the conveyor belts 9 keep moving during rotational movement of the rollers 1, 2. Since the rotating rollers 1, 2 and the conveying devices 7, 8 are supported independently of one another, the rotational movement of the rollers 1, 2 and the movement of the conveyor belts 9 of conveying devices 7, 8 can be carried out independently of each other. As the conveying devices 7, 8 are driven by one motor only, a synchronized conveying movement of the conveying devices 7, 8 is ensured.

Due to the joint access of the gear wheel 18 to both gear rims 16 it is ensured that the relative position of rollers 1, 2 can be controlled in parallel with respect to the breakthrough 6. After one complete rotation of rollers 1, 2, breakthroughs 6 of rollers 1, 2 are again located directly above conveyor belt 9 such that container 11 falls on the conveyor belts 9 of conveying devices 7, 8 after the rotational movement has stopped. Depending on the diameter of the container, a double or multiple rotation of rollers 1, 2 may be required in order to detect an identification feature on container 11. Conveyor belts 9 are made to move again and container 11 is advanced further. If the detector detects that container 11 is a kind of container for which a deposit is to be returned, container 11 is guided to a place located upstream of the transport device. But if it is. detected that container 11 is a kind of container for which no deposit needs to be returned, container 11 is transported back by the transport device towards the inlet area.

Figure 5:
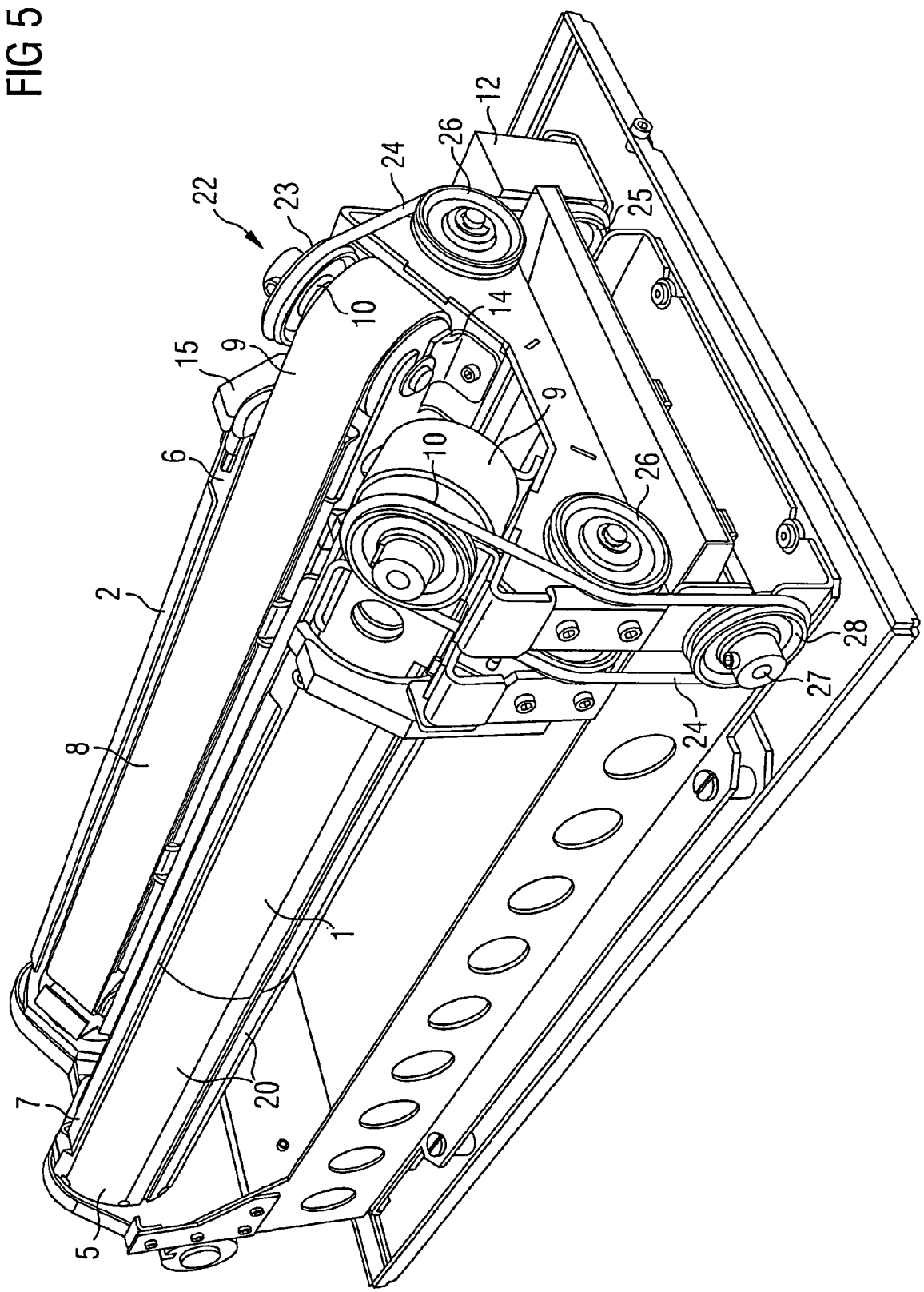
FIG. 5 shows an oblique view from the right hand side of a second embodiment of the unit.
Figure 6:
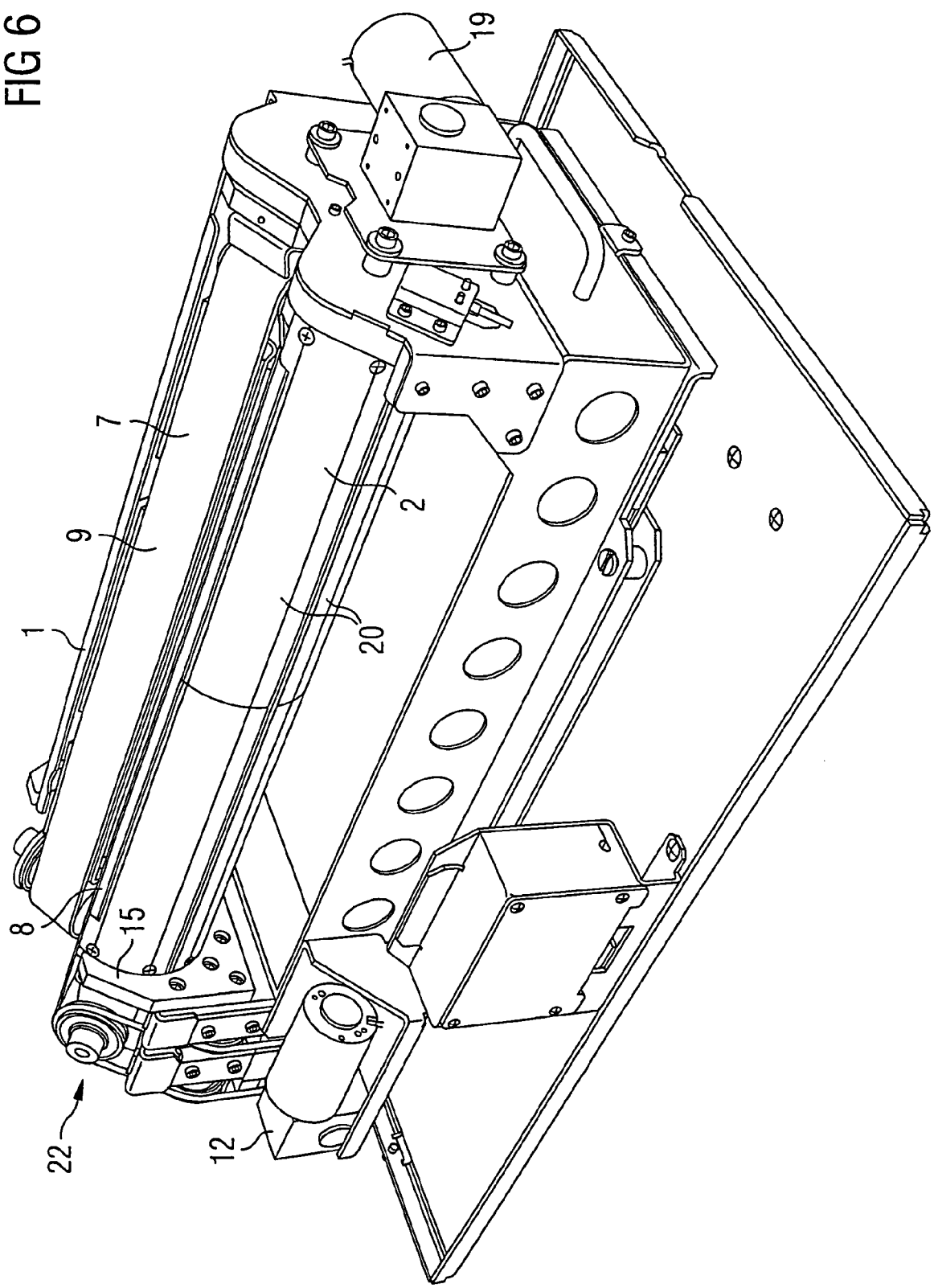
FIG. 6 shows an oblique view from the left hand side of the unit of FIG. 5.

In a further embodiment depicted in FIGS. 5 and 6, rollers 1, 2 are not made of a tube but of single lamellar segments 20 disposed in the longitudinal direction of the rollers 1, 2 and forming the surface areas 5 of rollers 1, 2. Segments 20 are substantially bent circularly such that they form sections of the cylindrical surface area 5. Segments 20 are threaded onto annular support bodies 21 on both ends, respectively. This allows an easier production of rollers 1, 2 with regard to manufacturing engineering. Furthermore, it may be intended to provide the surface area 5 of rollers 1, 2 with a coating to influence frictional contact between the rollers 1, 2 and the container 11 and to reduce running noise of the bottle during rotation.

In addition, it is intended with this embodiment to drive the turn around rollers 10 of the conveyor belts 9 by means of a coupled belt drive 22 and to thus allow a synchronous movement of the conveyor belts 9. The turn around rollers 10 of the conveying device 7, 8 are provided with a notch 23 for belts 24. The belts 24 surround a turn around disk 25 disposed on motor 12 and they are guided by two further turn around rollers 26. A shaft 27 connects the turn around disk 25 to another turn around disk 28 for driving the second conveying device 7. The advantage of a coupled belt drive 22 in comparison with a coupling 13 is that it is less susceptible to faults and therefore more suitable for continuous operation. The wheels and belts of the belt drive 22 are also positioned in an area that is less susceptible to dirt than the intermediate area between rollers 1, 2 because in this intermediate area, soiling may occur due to residue liquid in the bottles being spilled.

The invention claimed is:

1. A unit for automatic container recycling apparatuses for returning containers in a lying position, by means of a conveying device with a conveyor belt for advancing the containers in the direction of the longitudinal axis thereof, and with rotating rollers that are provided with a surface area and can be moved from a neutral position into an identifying position in which the rotating rollers disengage the container from the conveying device and make the container rotate,
   a. the rotating rollers are each embodied as hollow elements and are provided with at least one breakthrough in the longitudinal direction,
   b. at least one conveying device is disposed in the rollers, respectively, and the conveyor belt is arranged in the area of the breakthrough,
   c. the rotating rollers and the conveying device are mounted separately, the surface area of the rollers overlapping the conveyor belt of the conveying device when the rotating rollers are rotated.

2. The unit according to claim 1, wherein the conveyor belts of the conveying devices are arranged in v-shape.

3. The unit according to claim 1 wherein the conveyor belt is guided around turn around rollers that are attached to supports.

4. The unit according claim 1, wherein the rotating rollers are provided with a gear rim on the front side thereof which are driven by a gear wheel.

5. The unit according to claim 4, wherein the gear wheel is driven by a motor.

6. The unit according to claim 1, wherein the rollers can be moved from a neutral position, in which the breakthroughs are located directly above the conveyor belts with the conveyor belts forming a v-shaped groove for receiving and advancing the container, into an identifying position when rotating in the same direction around the axis thereof, in which identifying position the container is released from the conveyor belts, arrives on the rotating surface areas of the rollers and is rotated here.

7. The unit according to claim 1, wherein a detection unit for detecting an identification feature of the container during rotation of the container on the rollers.

8. The unit according to claim 1, wherein the rotating rollers are made of lamellar segments disposed in the longitudinal direction of the rollers.

9. The unit according to claim 8, wherein the segments are substantially bent circularly.

10. The unit according to claim 1, wherein a coupled belt drive for driving the conveyor belts of the conveying devices.

11. The unit according to claim 1, wherein the surface area of the rotating rollers is provided with a coating.

12. An apparatus for recycling containers with an inlet unit for returning containers in a lying position, according to claim 1.

13. A method for handling containers in a lying position, having the following features:
   a container can be laid on a conveying device comprising a first conveyor and a second conveyor each having one conveyor belt, wherein the conveyor belts substantially form a v-shape,
   the contour of the container is detected by means of a container detecting unit, the container is moved from a first position, lying on the conveyor belts, into a second position, lying on the surface areas of two rotating rollers and being rotated by them, the bearings of the rotating rollers are arranged stationarily in the relative position to one another, a code reader detects an identification code located on the container, depending on the detection of the identification code, the container in the first position is either guided to a place located upstream of the conveyors, or the container is transported back to a position located downstream of the conveyors or a loading position, wherein the rotating rollers are each embodied as hollow elements and are provided with a breakthrough in the longitudinal direction in the surface area, the first conveyor and the second conveyor are arranged inside the rotating rollers and are stationary in the relative position to one another, and in that the respective surface areas of the rotating rollers overlap the conveyor belts, lifting the container from the conveyor belts and rotating it when the rotating rollers are rotated.

14. The method according to claim 13, wherein a testing device determines whether or not an identification code is detectable on the container in the first position, the container is conveyed to the place located upstream of the conveyors or to the loading position if the identification code is detectable, the container is moved into the second position if the identification code is not detectable, and the container is rotated for detecting the identification code, and wherein the container is then moved back into the first position.

15. An apparatus for handling containers in a lying position, comprising:

a first conveyor and a second conveyor, each having one conveyor belt, wherein the conveyor belts are movable in a parallel direction, conveyor belts substantially forming a v-shape, a pair of rotating rollers, the rotational axes thereof pointing into the direction of movement of the conveyor belts and having the same rotational direction, a container being moved from a first position, lying on the conveyor belts, into a second position, lying on the surface area of the rotating rollers and being rotated by them, a detection unit being provided for detecting characteristic features of the container, wherein the apparatus guides the container in the first position either to a place located upstream of the conveyors or back to a position downstream of the conveyors, and wherein the bearings of the rotating rollers are arranged stationarily in the relative position to one another, wherein each rotating roller is embodied as a hollow element and has a breakthrough in the longitudinal direction in the surface area thereof, the first conveyor and the second conveyor are arranged inside the rotating rollers and are stationary in the relative position to one another, and in that the respective surface areas of the rotating rollers overlap the conveyor belts, lifting the container from the conveyor belts and rotating it when the rotating rollers are rotated.

16. The apparatus according to claim 15, wherein the rotating rollers do not rotate during detection of the characteristic feature of the container contour.

17. An apparatus for handling containers in a lying position having the following features:

a container is attachable to a conveying device comprising a first conveyor and a second conveyor, each having one conveyor belt, wherein the conveyor belts substantially form a v-shape, the contour of the container is detected by means of a container detecting unit, the container is moved from a first position, lying on the conveyor belts, into a second position, lying on the surface areas of two rotating rollers and being rotated by them, the bearings of the rotating rollers are arranged stationarily in the relative position to one another, a code reader detects the identification code located on the container, depending on the detection of the identification code, the container in the first position is either guided to a place located upstream of the conveyors, or the container is transported back to a position located downstream of the conveyors or a loading position, wherein the rotating rollers) are each embodied as hollow elements and are provided with a breakthrough in the longitudinal direction in the surface area, the first conveyor and the second conveyor are arranged inside the rotating rollers and are stationary in the relative position to one another, and in that the respective surface areas of the rotating rollers overlap the conveyor belts, lifting the container from the conveyor belts and rotating it when the rotating rollers are rotated.

18. The apparatus according to claim 17, wherein a testing device determines whether or not an identification code is detectable on the container in the first position, the container is conveyed to the place located upstream of the conveyors or to the loading position if the identification code is detectable, the container is moved into the second position if the identification code is not detectable, and the container is rotated for detecting the identification code, and wherein the container is then moved back into the first position.

* * * * *